US012715508B2

(12) United States Patent
Habibnejad Korayem et al.

(10) Patent No.: US 12,715,508 B2
(45) Date of Patent: Aug. 25, 2026

(54) METHOD AND ALGORITHM TO VIRTUALLY MEASURE AND ESTIMATE STEERING RACK FORCE AND VALIDATE SENSORY DATA

(71) Applicant: GM Global Technology Operations LLC, Detroit, MI (US)

(72) Inventors: Amin Habibnejad Korayem, Markham (CA); Seyedeh Asal Nahidi, North York (CA); Mahdokht Ezati, Pickering (CA); SeyedAlireza Kasaiezadeh Mahabadi, Novi, MI (US); Hojjat Izadi, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 110 days.

(21) Appl. No.: 18/934,835

(22) Filed: Nov. 1, 2024

(65) Prior Publication Data

US 2026/0125109 A1 May 7, 2026

(51) Int. Cl.
*B62D 6/00* (2006.01)

(52) U.S. Cl.
CPC .................................... *B62D 6/008* (2013.01)

(58) Field of Classification Search
CPC ........................................................ G01L 5/22
USPC ........................................................... 701/41
See application file for complete search history.

(56) References Cited

U.S. PATENT DOCUMENTS

2019/0308659 A1 10/2019 Pramod et al.
2019/0308664 A1 10/2019 Pramod et al.
2022/0212713 A1* 7/2022 Shin ........................ B62D 5/046
2024/0336300 A1* 10/2024 Meyer .................... B62D 6/008
2024/0343260 A1* 10/2024 Kunihiro ............. B60W 60/001

OTHER PUBLICATIONS

German Office Action for German Application No. 102024139732.2; dated Jul. 14, 2025; 3 pages.

* cited by examiner

*Primary Examiner* — Yi-Kai Wang
(74) *Attorney, Agent, or Firm* — CANTOR COLBURN LLP

(57) ABSTRACT

A vehicle includes a system that performs a method of operating the vehicle. A steering rack is coupled to at least one of a left wheel and a right wheel. A sensor obtains a measurement of a dynamic parameter of the vehicle related to a force at the steering rack. A processor determines a first estimate of a rack force resulting from the force based on the measurement of the dynamic parameter, obtains a second estimate of the rack force based on a signal from a road wheel actuator coupled to the steering rack, selects an arbitrated rack force from the first estimate of the rack force and the second estimate of the rack force, and activates a hand wheel actuator coupled to a steering wheel of the vehicle based on the arbitrated rack force to generate a feedback torque at the steering wheel.

20 Claims, 6 Drawing Sheets

METHOD AND ALGORITHM TO VIRTUALLY MEASURE AND ESTIMATE STEERING RACK FORCE AND VALIDATE SENSORY DATA

The subject disclosure relates to the operation of a vehicle, and in particular, to a system and method for applying a feedback torque to a steering wheel of a steer-by-wire steering system of the vehicle to correspond to a force at a steering rack of the vehicle.

Steer-by-wire systems have been developed to steer a vehicle. In a steer-by-wire system, there is no mechanical connection between a steering wheel and a road wheel actuator that steers the wheels of the vehicle. Instead, communication is between the steering wheel and a controller and between the controller and the road wheel actuator. Due to the lack of mechanical connection, external forces occurring at the steering rack, such as a sudden impulse when the vehicle encounters a pothole, are not translated to the steering wheel. Thus, the driver can be unaware of the driving conditions and external forces. Accordingly, it is desirable to provide a system and method for providing a feedback torque to the driver to better immerse the driver in the driving experience.

SUMMARY

In one exemplary embodiment, a method of operating a vehicle is disclosed. A measurement of a dynamic parameter of the vehicle related to a force at a steering rack of the vehicle is obtained. The steering rack is coupled to at least one of a left wheel and a right wheel. A first estimate of a rack force is determined, the first estimate resulting from the force based on the measurement of the dynamic parameter. A second estimate of the rack force is determined, the second estimated based on a signal from a road wheel actuator coupled to the steering rack. An arbitrated rack force is selected from the first estimate of the rack force and the second estimate of the rack force. A hand wheel actuator coupled to a steering wheel of the vehicle is activated based on the arbitrated rack force to generate a feedback torque at the steering wheel.

In addition to one or more of the features described herein, the dynamic parameter includes at least one of an externally applied force on a tire, an acceleration obtained at an inertial measurement unit (IMU), a road wheel angle, and a longitudinal velocity of the vehicle.

In addition to one or more of the features described herein, the method further includes determining a right wheel estimate of the rack force using forces on a front right wheel of the vehicle, determining a left wheel estimate of the rack force using forces on a front left wheel of the vehicle, and determining the first estimate of the rack force based on the right wheel estimate and the left wheel estimate.

In addition to one or more of the features described herein, the method further comprising determining a fault in at least one of the measurement of the dynamic parameter used to calculate the first estimate and the signal from the road wheel actuator used to calculate the second estimate.

In addition to one or more of the features described herein, the method further includes selecting the second estimate as the arbitrated rack force when no fault is found in the signal from the road wheel actuator.

In addition to one or more of the features described herein, at least one of the first estimate of the rack force and the second estimate of the rack force includes a temporal sequence of forces.

In addition to one or more of the features described herein, the steering wheel and the steering rack are mechanically disconnected from each other and are each coupled to a steer-by-wire system.

In another exemplary embodiment, a system for operating a vehicle is disclosed. The system includes a steering rack coupled to at least one of a left wheel and a right wheel, a sensor for obtain a measurement of a dynamic parameter of the vehicle related to a force at the steering rack, and a processor. The processor is configured to determine a first estimate of a rack force resulting from the force based on the measurement of the dynamic parameter, obtain a second estimate of the rack force based on a signal from a road wheel actuator coupled to the steering rack, select an arbitrated rack force from the first estimate of the rack force and the second estimate of the rack force, and activate a hand wheel actuator coupled to a steering wheel of the vehicle based on the arbitrated rack force to generate a feedback torque at the steering wheel.

In addition to one or more of the features described herein, the dynamic parameter includes at least one of an externally applied force on a tire, an acceleration obtained at an inertial measurement unit (IMU), a road wheel angle, and (iv) a longitudinal velocity of the vehicle.

In addition to one or more of the features described herein, the processor is further configured to determine a right wheel estimate of the rack force using forces on a front right wheel of the vehicle, determine a left wheel estimate of the rack force using forces on a front left wheel of the vehicle, and determine the first estimate of the rack force based on the right wheel estimate and the left wheel estimate.

In addition to one or more of the features described herein, the processor is further configured to determine a fault in at least one of: (i) the measurement of the dynamic parameter used to calculate the first estimate; and (ii) the signal from the road wheel actuator used to calculate the second estimate.

In addition to one or more of the features described herein, the processor is further configured to select the second estimate as the arbitrated rack force when no fault is found in the signal from the road wheel actuator.

In addition to one or more of the features described herein, at least one of the first estimate of the rack force and the second estimate of the rack force includes a temporal sequence of forces.

In addition to one or more of the features described herein, the steering wheel and the steering rack are mechanically disconnected from each other and are each coupled to a steer-by-wire system.

In yet another exemplary embodiment, a vehicle is disclosed. The vehicle includes a steering wheel, a steering rack coupled to at least one of a left wheel and a right wheel, a sensor for obtain a measurement of a dynamic parameter of the vehicle related to a force at the steering rack, and a steer-by-wire system coupled to the steering wheel and to the steering rack. The steer-by-wire system includes a processor configured to determine a first estimate of a rack force resulting from the force based on the measurement of the dynamic parameter, obtain a second estimate of the rack force based on a signal from a road wheel actuator coupled to the steering rack, select an arbitrated rack force from the first estimate of the rack force and the second estimate of the rack force, and activate a hand wheel actuator coupled to the steering wheel of the vehicle based on the arbitrated rack force to generate a feedback torque at the steering wheel.

In addition to one or more of the features described herein, the dynamic parameter includes at least one of an externally applied force on a tire, an acceleration obtained at an inertial measurement unit (IMU), a road wheel angle, and a longitudinal velocity of the vehicle.

In addition to one or more of the features described herein, the processor is further configured to determine a right wheel estimate of the rack force using forces on a front right wheel of the vehicle, determine a left wheel estimate of the rack force using forces on a front left wheel of the vehicle, and determine the first estimate of the rack force based on the right wheel estimate and the left wheel estimate.

In addition to one or more of the features described herein, the processor is further configured to determine a fault in at least one of the measurement of the dynamic parameter used to calculate the first estimate and the signal from the road wheel actuator used to calculate the second estimate.

In addition to one or more of the features described herein, the processor is further configured to select the second estimate as the arbitrated rack force when no fault is found in the signal from the road wheel actuator.

In addition to one or more of the features described herein, at least one of the first estimate of the rack force and the second estimate of the rack force includes a temporal sequence of forces.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
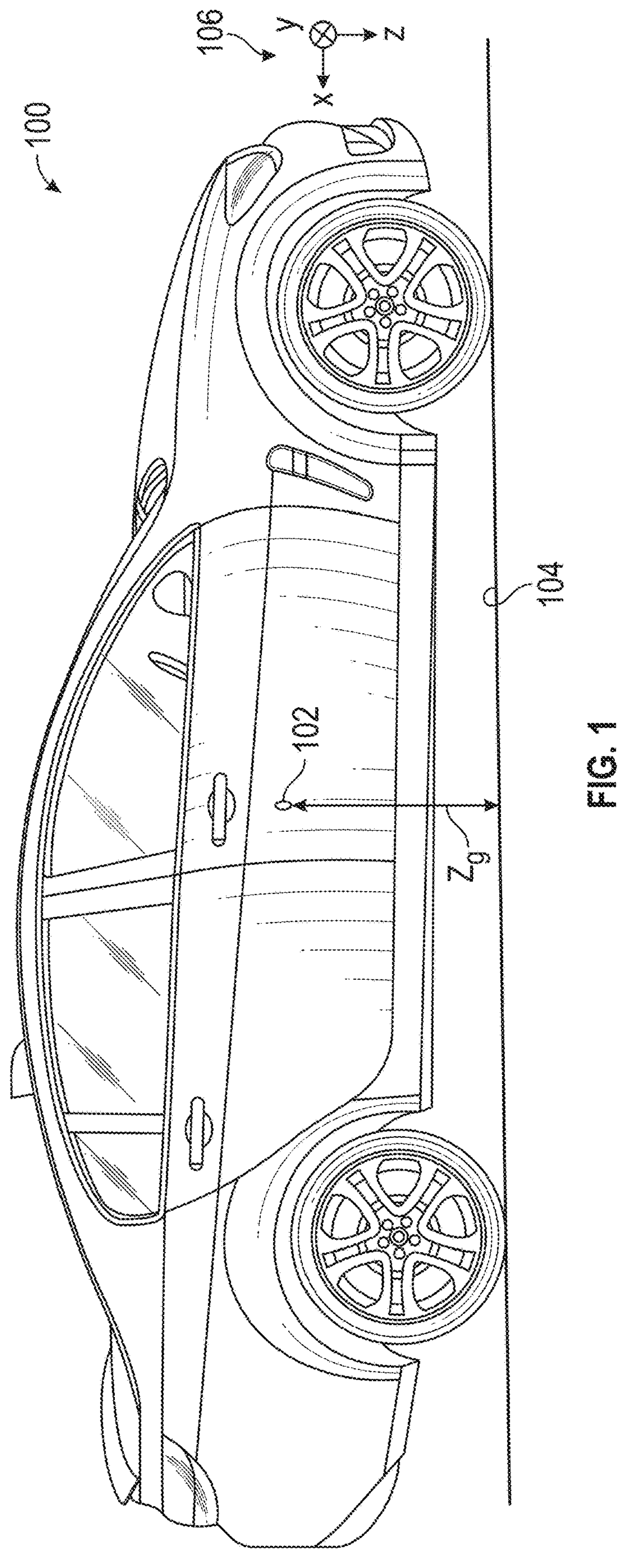
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows a vehicle 100. The vehicle has a center of mass 102 located at a distance $Z_g$ above the ground 104. A body-centered coordinate system 106 is shown for illustrative purposes. The body-centered coordinate system 106 includes an x-axis aligned with a longitudinal axis of the vehicle 100, a y-axis is aligned along the lateral axis of the vehicle, and a z-axis pointing vertically downward.

Figure 2:
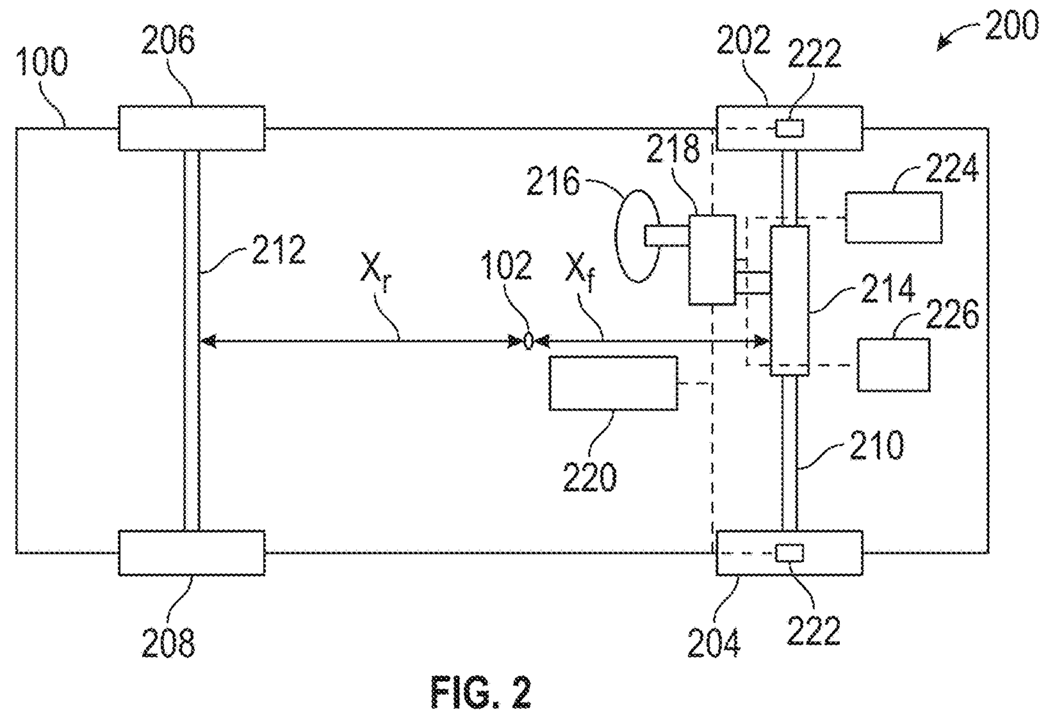
FIG. 2 shows a schematic plan view of the vehicle in an illustrative embodiment.

FIG. 2 shows a schematic plan view 200 of the vehicle 100 in an illustrative embodiment. The plan view 200 shows a front left wheel 202, a front right wheel 204, a rear left wheel 206 and a rear right wheel 208. The front left wheel 202 and the front right wheel 204 are connected by a front axle 210. The rear left wheel 206 and the rear right wheel 208 are connected by a rear axle 212.

A steering rack 214 is coupled to the front axle 210. The steering rack 214 moves in a lateral direction (along the y-axis) based on a steering angle of a steering wheel 216. The movement of the steering rack 214 changes the road wheel angle (RWA) of the front left wheel 202 and front right wheel 204. A steering system 218 controls the steering of the vehicle. In various embodiments, the steering system 218 is a steer-by-wire system.

The vehicle 100 further includes various sensors for detecting dynamic parameters of the vehicle. The sensors include, but are not limited to, an inertial measurement unit (IMU) 220 which measures accelerations occurring at the vehicle along one or more axes, tire force sensors 222 which measure forces on the tires, a road wheel angle sensor 224 (RWA sensor) which measures road wheel angle (RWA), and a speedometer 226 that measures a longitudinal velocity $v_x$ of the vehicle. The steering system 218 is in communication with these sensors and can receive data, perform calculations based on the data, and can determine various forces on the steering rack 214 using this data.

Figure 3:
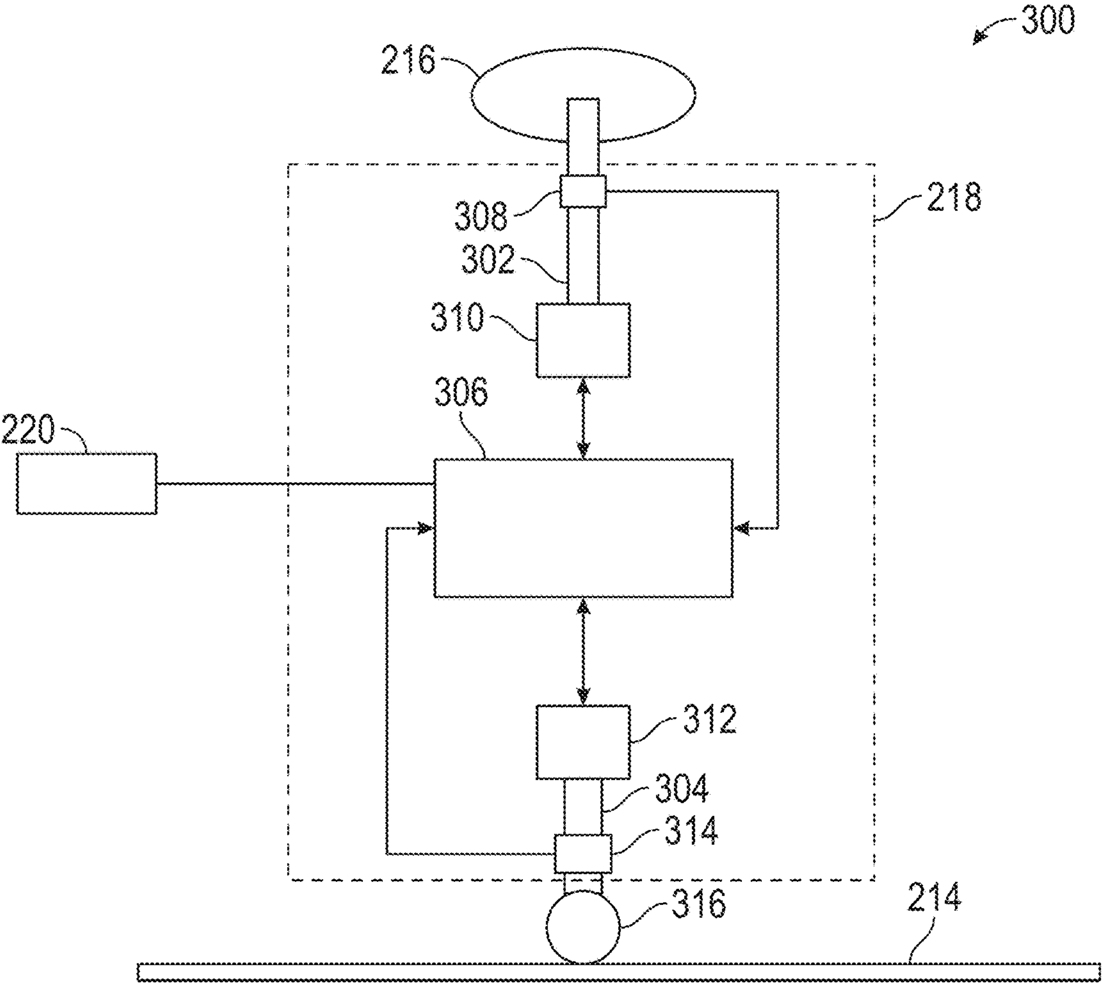
FIG. 3 is a diagram of the steering system in an illustrative embodiment.

FIG. 3 is a diagram 300 of the steering system 218 in an illustrative embodiment. The steering system 218 is in communication with both the steering wheel 216 and the steering rack 214. The steering wheel 216 and the steering rack are mechanically separated from each other. The steering system 218 includes a steering post 302, a steering column 304 and a controller 306.

The steering post 302 includes a steering angle sensor 308 and a hand wheel actuator 310. The steering angle sensor 308 measures a steering wheel angle (SWA) of the steering wheel 216 by measuring a rotation angle of the steering post 302. The steering angle sensor 308 provides a signal indicative of the SWA to the controller 306. The controller 306 also can provide a feedback torque command to the hand wheel actuator 310, which provides a feedback torque to the steering post 302 based on the feedback torque command.

The steering column 304 includes a road wheel actuator 312 and a road wheel angle sensor 314. The road wheel angle sensor 314 measures a road wheel angle (RWA) of the wheels (e.g., one or more of front left wheel 202 and front right wheel 204) and sends the RWA to the controller 306. The controller 306 sends a suitable signal to the road wheel actuator 312. The road wheel actuator 312 controls rotation of a pinion 316. The pinion 316 is mechanically connected to the steering rack 214. Rotation of the pinion 316 thus moves the steering rack laterally, thereby changing the RWA of the wheels.

The controller 306 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 306 may include a non-transitory computer-readable medium that stores instructions which, when processed by one or more processors of the controller 306, implement a method of providing a feedback torque to the steering wheel 216, according to one or more embodiments detailed herein.

To steer the vehicle 100, the steering angle sensor 308 sends the SWA to the controller 306. The controller 306 calculates a suitable RWA for the wheels based on the SWA and sends the suitable RWA to road wheel actuator 312. The road wheel actuator 312 then controls the steering rack 214 to implement the RWA at the wheels. To provide feedback to the driver, the road wheel angle sensor 314 provides a road wheel angle to the controller 306. The controller 306 calculates forces at the steering rack based on the dynamic parameter data obtained from the sensors, determines a suitable feedback torque for the steering wheel to correspond to the forces at the steering rack, and provides the feedback torque to the hand wheel actuator 310. The hand wheel actuator 310 applies the feedback torque to the steering post 302.

Figure 4:
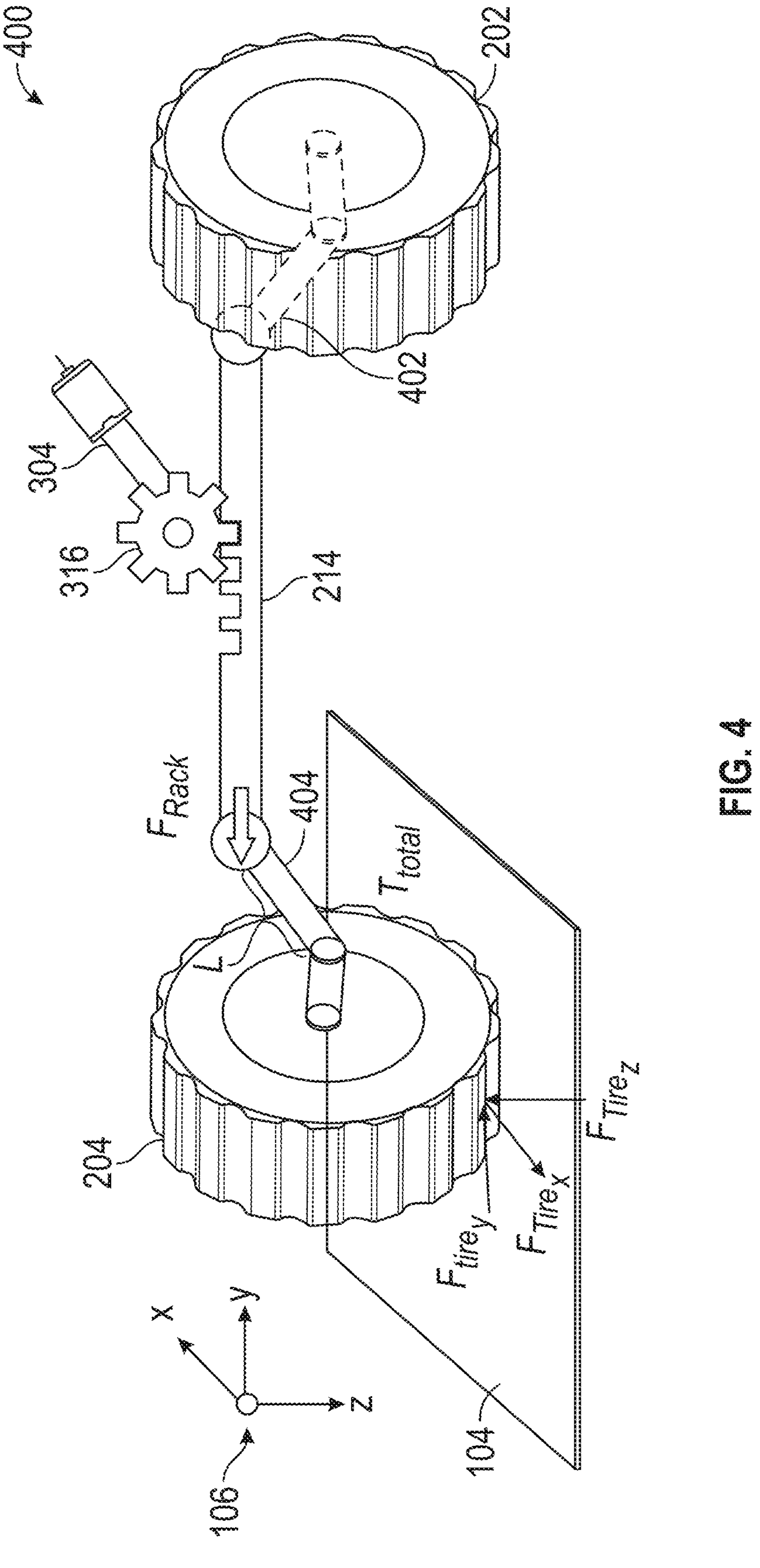
FIG. 4 is a diagram illustrating forces at the steering rack and wheels of the vehicle.

FIG. 4 is a diagram 400 illustrating forces at the steering rack 214 and wheels of the vehicle 100. The steering rack 214 is connected to the front left wheel 202 via a left steering arm 402 and to the front right wheel 204 via a right steering arm 404.

A force appears at the steering rack 214 as a result of externally applied forces experienced at the wheels, such as wheel contact forces, rolling forces, etc. The methods disclosed herein are discussed using the front right wheel 204 as an example. The wheel forces are shown at the point of contact between the front right wheel 204 and the ground. Forces on the tires due to the road include a longitudinal tire force ($F_{x_{total}}$), a lateral tire force ($F_{y_{total}}$) and a normal tire force ($F_{z_{total}}$). These forces are responsible for creating a torque at the wheel, which translates into a rack force.

The longitudinal tire force $F_{x_{total}}$ is described with respect to force components as shown in Eq. (1):

$$F_{x_{total}} = (F_{tire_x} - F_{rolling})\cos(\delta_w) - F_{tire_y}\sin(\delta_w) \quad \text{Eq. (1)}$$

where $F_{tire_x}$ is a road contact force on the tire in the longitudinal direction, $F_{tire_y}$ is the road contact force on the tire in the lateral direction, $F_{rolling}$ is the force generated by rolling resistance, and ow is the road wheel angle (RWA). The rolling resistance is described in Eq. (2):

$$F_{rolling} = -f_r g \min(1, v_x)\,\mathrm{sign}(v_x) \quad \text{Eq. (2)}$$

where $f_r$ is the friction force, $v_x$ is the longitudinal velocity of the vehicle, and g is the acceleration of gravity.

The lateral tire force $F_{y_{total}}$ is described with respect to force components as shown in Eq. (3):

$$F_{y_{total}} = F_{tire_y}\cos(\delta_w) + (F_{tire_x} - F_{rolling})\sin(\delta_w) \quad \text{Eq. (3)}$$

The normal tire force $F_{z_{total}}$ is described with respect to force components as shown in Eq. (4):

$$F_{z_{total}} = \frac{N_{fx}}{2} + \frac{Z_g N_{fx} a_y}{L_f g} \quad \text{Eq. (4)}$$

where $Z_g$ is the height of the center of mass of the vehicle with respect to the ground, $a_y$ is the lateral acceleration of the vehicle, g is the acceleration of gravity, $L_f$ is the axle length and $N_{fx}$ is given in Eq. (5):

$$N_{fx} = \frac{mgX_r}{X_r + X_f} - \frac{ma_x Z_g}{X_r + X_f} \quad \text{Eq. (5)}$$

where $X_r$ is the longitudinal distance between the center of mass and the rear axle, $X_f$ is the longitudinal distance between the center of mass and the front axle, $a_x$ is the longitudinal acceleration of the vehicle, and m is the mass of the vehicle.

Forces at the steering rack can be determined once the externally applied wheel forces have been calculated. A resistance force $F_{rack}$ can be calculated from a resistance torque around the steering axis of the front right wheel 204 (which extends along the length L of the right steering arm 404), as shown in Eq. (6):

$$F_{rack} = \frac{T_{total}}{L} \quad \text{Eq. (6)}$$

where $T_{total}$ is the total resistant torque generated around the steering axis. The total resistance torque $T_{total}$ can be decomposed into its torque components, as shown in Eq. (7):

$$T_{total} = T_{x_{total}} + T_{y_{total}} + T_{z_{total}} \quad \text{Eq. (7)}$$

The x-axis torque component $T_{x_{total}}$ is related to the longitudinal tire force $T_{x_{total}}$ as shown in Eq. (8):

$$T_{x_{total}} = F_{x_{total}}\cos(\tau)\,[r_{kp}\cos(\gamma) + R_{nom}\sin(\gamma)] \quad \text{Eq. (8)}$$

where τ is a caster angle of the wheel, γ is a kingpin angle, $r_{kp}$ is a kingpin radius and $R_{nom}$ is a nominal radius of the tire. The y-axis torque component $T_{y_{total}}$ is shown in Eq. (9):

$$T_{y_{total}} = F_{y_{total}}\cos(\tau)\,[t\cos(\tau) + R_{nom}\sin(\tau)] \quad \text{Eq. (9)}$$

where t is the static offset of the wheel. The z-axis torque component $T_{z_{total}}$ is shown in Eq. (10):

$$T_{z_{total}} = F_{z_{total}}\sin(\gamma)\cos(\tau)\sin(\delta_w)\,[\cos(\tau)\,(r_{kp} + R_{nom}\sin(\tau))] \quad \text{Eq. (10)}$$

Figure 5:
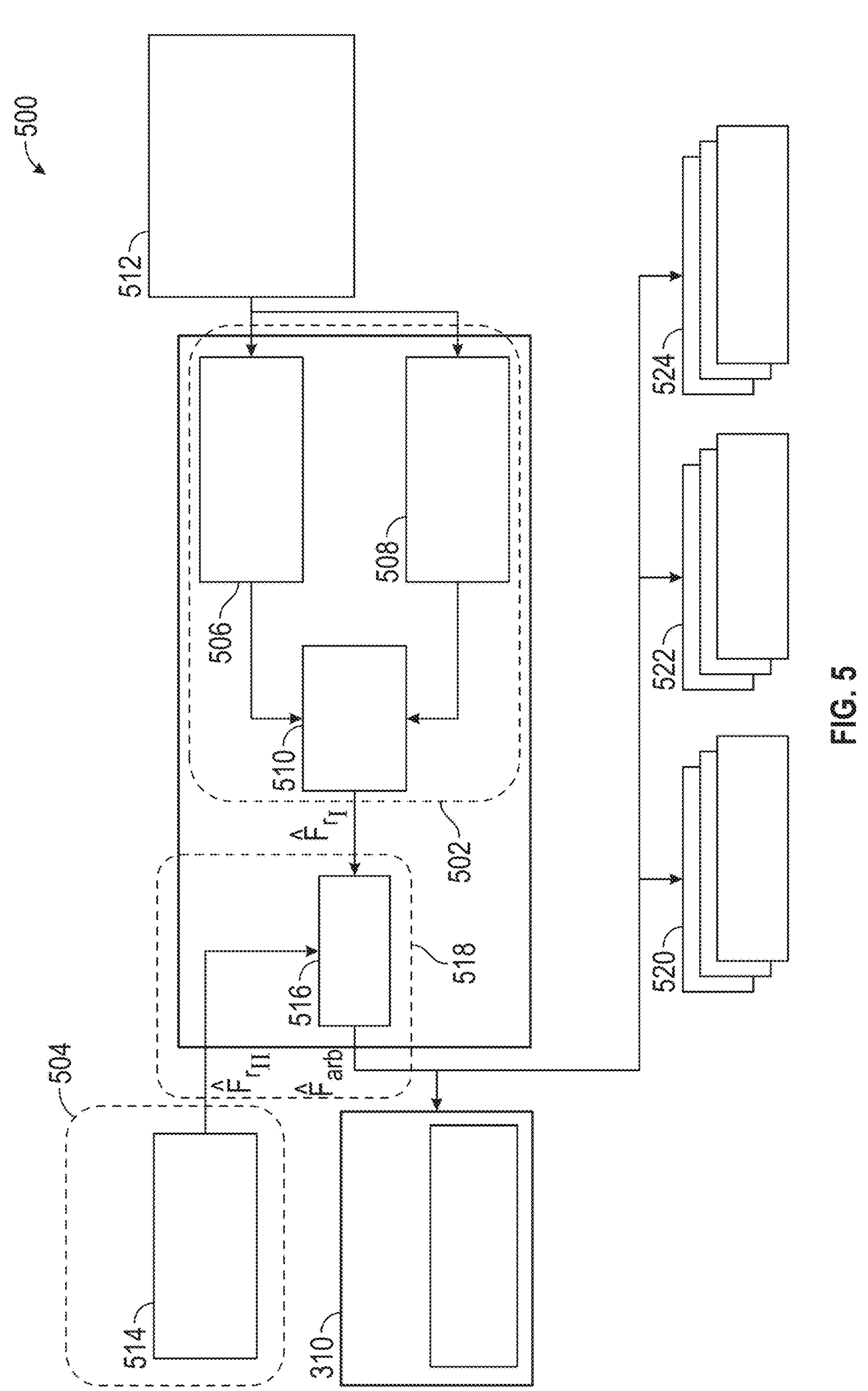
FIG. 5 is a diagram of a system architecture for calculating steering rack forces suitable and consequently providing a feedback torque.

FIG. 5 is a diagram 500 of a system architecture for calculating steering rack forces and consequently providing a feedback torque. The system architecture includes a first set of modules 502 for performing a first method of calculating steering rack forces using forces on the wheels and a second set of modules 504 for performing a second method of calculating steering rack forces using signals from the road wheel actuator 312. The first set of modules 502 includes a right wheel rack force estimation module 506, a left wheel rack force estimation module 508 and a dynamic estimation module 510. The right wheel rack force estimation module 506 calculates a right wheel estimate of steering rack force using tire forces measured at the front right wheel 204. The left wheel rack force estimation module 508 calculates a left wheel estimate of steering rack force using tire forces measured at the front left wheel 202. Calculations at these modules use data from sensors 512, including the inertial measurements unit (IMU) 220, tire force sensors 222, road wheel angle sensor 224 and speedometer 226. It is understood that the data is provided to the estimation modules in a temporal sequence or over a plurality of time steps of a selected time interval. Thus, each module calculates a temporal sequence of forces and provides the temporal sequence to the dynamic estimation module 510. The dynamic estimation module 510 outputs a first estimate of steering rack force $\hat{F}_{r_I}$, based on the right wheel estimate and the left wheel estimate. The first estimate $\hat{F}_{r_I}$ can be a temporal sequence or temporal vector.

The second set of modules 504 receives signals (e.g., current, pulses, etc.) from the road wheel actuator 312 and calculates a second estimate of steering rack force $\hat{F}_{r_{II}}$ based on these signals.

An arbitration module 516 performs an arbitration step 518. The arbitration module 516 receives the first estimate of rack force $\hat{F}_{r_I}$ from the dynamic estimation module 510 and the second estimate of rack force $\hat{F}_{r_{II}}$ from the RWA-based estimator 514. The arbitration module 516 determines whether one or both of the first estimate $\hat{F}_{r_I}$ of rack force and the second estimate $\hat{F}_{r_{II}}$ of rack force are valid. This can involve determining whether the data used to calculate these estimated rack forces are valid or if a fault occurs during estimate of one or more of these forces. The arbitration module 516 selects from between the first estimate of rack force $\hat{F}_{r_I}$ and the second estimate of rack force $\hat{F}_{r_{II}}$ based on the validity of the input data and outputs an arbitrated rack force $\hat{F}_{r_{arb}}$ to the hand wheel actuator 310. The hand wheel actuator 310 then applies a feedback torque to the steering post indicative of the arbitrated rack force $\hat{F}_{r_{arb}}$.

The arbitration module 516 also sends the arbitrated rack force $\hat{F}_{arb}$ to additional modules being operated at the controller 306, including a steering control module 520, a steering estimation module 522 and a steering diagnostics module 524. The steering control module 520 uses the arbitrated rack force $\hat{F}_{r_{arb}}$ to control the steering rack in a manner that counteracts the steering rack force. The steering estimation module 522 controls the feel of the feedback torque at the steering wheel 216. The steering diagnostics module 524 monitors the steering rack force to determine suitability of control operations. For example, the steering diagnostics module 524 can determine whether the steering rack force is within a range that allows continued operation of the vehicle or if remedial action is to be taken.

Referring to the rack force estimate of the first set of modules 502, the rack force can be estimated by updating a state equation over a plurality of time steps. x[k] represents an estimation of rack force at time step k and is calculated from state measurements corresponding to time step k. The rack force is updated to next time step k+1.

$$x[k+1] = x[k] + \Delta t(Kx[k] - x_{des}[k]) \quad \text{Eq. (11)}$$

where Δt is a difference between time steps, K is system dynamics gain and $x_{des}$[k] is a ground truth estimate of rack force at time step k. Eq. (11) can be rewritten as shown in Eq. (12)

$$x[k+1] = Ax[k] + Bu[k] \quad \text{Eq. (12)}$$

where $$x[k] = F_r[k] \quad \text{Eq. (14)}$$

$$A = [1 + \Delta tK] \quad \text{Eq. (15)}$$

is a system matrix, and $$B = -\Delta tI_{1*1} \quad \text{Eq. (16)}$$

is an input matrix. The input u[k] is given as shown in Eq. (17)

$$u[k] = \frac{1}{L}\big(F_{x_{total}}\cos(\tau)[r_{kp}\cos(\gamma) + R_{nom}\sin(\gamma)] + F_{y_{total}}\cos(\gamma)[t\cos(\tau) + R_{nom}\sin(\tau)] + T_{z_{total}}\big) \quad \text{Eq. (17)}$$

Figure 6:
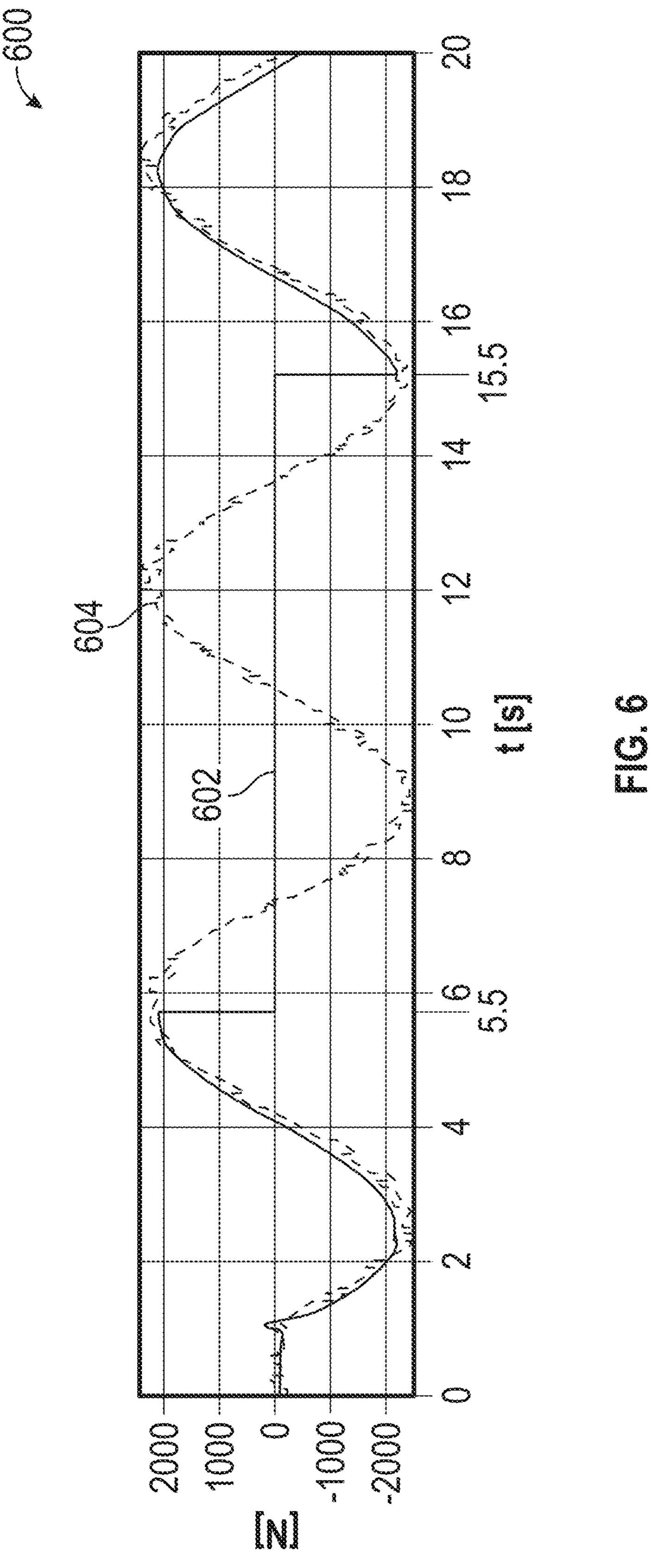
FIG. 6 is a graph showing illustrative estimates of rack forces.

FIG. 6 is a graph 600 showing illustrative estimates of rack forces. Time is shown along the abscissa in seconds(s) and rack force is shown along the ordinate axis in Newtons (N). A first curve 602 shows a time evolution of the first estimate of steering rack force $\hat{F}_{r_I}$. A second curve 604 shows a time evolution of the second estimate of steering rack force $\hat{F}_{r_{II}}$. At about t=5.5 seconds, a fault occurs at the road wheel actuator 312. The fault lasts until about 15.5 seconds. Thus, the second curve 604 displays a fault line that does not match the first curve 602. During this fault, the arbitration module 516 can select to use the first estimate $\hat{F}_{r_I}$ of rack force (first curve 602) as the arbitrated steering rack force $\hat{F}_{r_{arb}}$. Otherwise, the second estimate $\hat{F}_{r_{II}}$ of steering rack for is used at the arbitrated steering rack force $\hat{F}_{r_{arb}}$.

Figure 7:
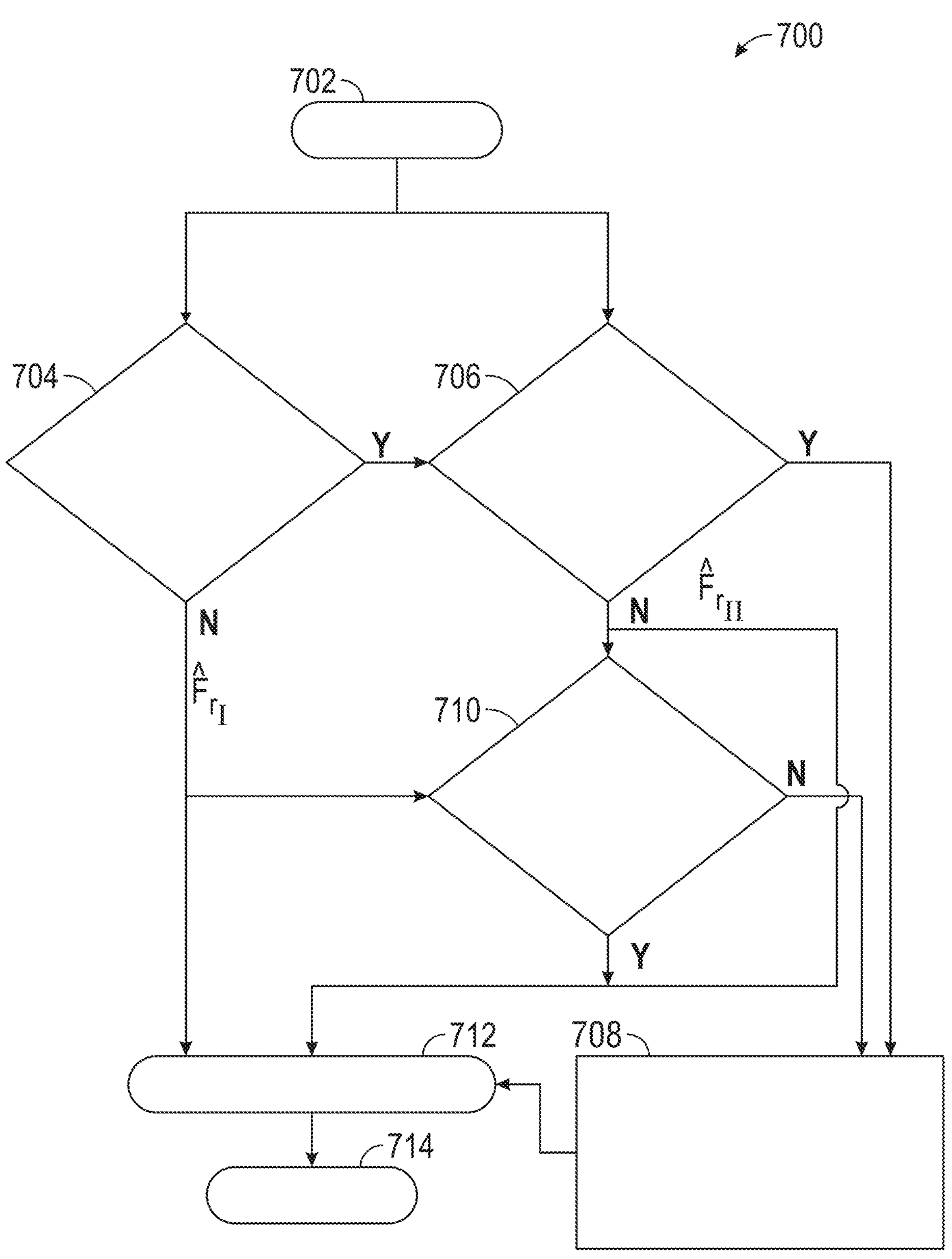
FIG. 7 is a flowchart of an arbitration process for the estimated rack forces.

FIG. 7 is a flowchart 700 of an arbitration process for the estimated rack forces. The method beings at box 702. In box 704, a check is made on input signals used in the calculations for the first estimate of rack force $\hat{F}_{r_I}$. The check detects the occurrence of any faults in the input signals and/or degradation in the quality of the first estimate of rack force $\hat{F}_{r_I}$. If any faults have occurred, the method proceeds to box 706. Otherwise, the method proceeds to box 712. Box 712 is an arbitration process. The arbitration process is performed using the first estimate of rack force ($\hat{F}_{r_I}$) estimated using the first set of modules 502. And the second estimate of rack force ($\hat{F}_{r_{II}}$) estimated using the second set of modules 504.

In box 706, a check is made on input signals used to calculate the second estimate of rack force $\hat{F}_{r_{II}}$. The check detects the occurrence of any faults in the input signals and/or degradation in the quality of the second estimate of rack force $\hat{F}_{r_{II}}$. If any faults have occurred, the method proceeds to box 708. In box 708, a signal is provided to a controller 306 to indicate the unavailability of the rack force estimate. The controller 306 can take a remedial action based on the absence of the estimate of rack force.

Returning to box 706, if no fault occurs in calculating the second estimate of rack force $\hat{F}_{r_{II}}$, the second estimate of rack force is provided to box 710. In box 710, the estimates of rack forces are compared to determine a coherency of the estimates. A Mahala-Nobis distance is calculated between the first estimate of rack force $\hat{F}_{r_I}$ and the second estimate of rack force $\hat{F}_{r_{II}}$. The Mahala-Nobis distance is calculated as shown in Eq. (18):

$$T = \frac{1}{2}\left(\hat{F}_{r_J} - \hat{F}_{r_{Ii}}\right)^T C^{-1}\left(\hat{F}_{r_I} - \hat{F}_{r_{Ii}}\right) \quad \text{Eq. (18)}$$

where T is the Mahala-Nobis distance and C is the sum of variance-covariance matrices related to the two estimates of rack forces. The Mahala-Nobis distance is compared to threshold to determine coherency between the estimates.

If $T>=T_u$ (where $T_u$ is a calibratable threshold) the estimates are coherent and the method proceeds to box 708. Otherwise ($T<T_u$), the estimates are not coherent and method proceeds to box 712. In box 712, arbitration is performed. The first estimate of rack force and the second estimate of rack force are arbitrated based on an arbitration logic. During arbitration, the second estimate of rack force (calculated from the RWA signals) has a first priority over the first estimate of rack force (calculated using tire forces). Thus, the second estimate of rack force is selected when there is no fault or degradation detected with respect to calculation of the second estimate (using RWA signal). When a fault occurs in the second estimate, the first estimate is used. In box 714, the method ends.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:

obtaining a measurement of a dynamic parameter of the vehicle related to a force at a steering rack of the vehicle, the steering rack coupled to at least one of a left wheel and a right wheel;

determining a first estimate of a rack force resulting from the force based on the measurement of the dynamic parameter;

obtaining a second estimate of the rack force based on a signal from a road wheel actuator coupled to the steering rack;

selecting an arbitrated rack force from the first estimate of the rack force and the second estimate of the rack force; and activating a hand wheel actuator coupled to a steering wheel of the vehicle based on the arbitrated rack force to generate a feedback torque at the steering wheel.

2. The method of claim 1, wherein the dynamic parameter includes at least one of: (i) an externally applied force on a tire; (ii) an acceleration obtained at an inertial measurement unit (IMU); (iii) a road wheel angle; and (iv) a longitudinal velocity of the vehicle.

3. The method of claim 1, further comprising determining a right wheel estimate of the rack force using forces on a front right wheel of the vehicle, determining a left wheel estimate of the rack force using forces on a front left wheel of the vehicle, and determining the first estimate of the rack force based on the right wheel estimate and the left wheel estimate.

4. The method of claim 1, further comprising determining a fault in at least one of: (i) the measurement of the dynamic parameter used to calculate the first estimate; and (ii) the signal from the road wheel actuator used to calculate the second estimate.

5. The method of claim 4, further comprising selecting the second estimate as the arbitrated rack force when no fault is found in the signal from the road wheel actuator.

6. The method of claim 1, wherein at least one of the first estimate of the rack force and the second estimate of the rack force includes a temporal sequence of forces.

7. The method of claim 1, wherein the steering wheel and the steering rack are mechanically disconnected from each other and are each coupled to a steer-by-wire system.

8. A system for operating a vehicle, comprising:

a steering rack coupled to at least one of a left wheel and a right wheel;

a sensor for obtaining a measurement of a dynamic parameter of the vehicle related to a force at the steering rack;

a processor configured to:

determine a first estimate of a rack force resulting from the force based on the measurement of the dynamic parameter;

obtain a second estimate of the rack force based on a signal from a road wheel actuator coupled to the steering rack;

select an arbitrated rack force from the first estimate of the rack force and the second estimate of the rack force; and activate a hand wheel actuator coupled to a steering wheel of the vehicle based on the arbitrated rack force to generate a feedback torque at the steering wheel.

9. The system of claim 8, wherein the dynamic parameter includes at least one of: (i) an externally applied force on a tire; (ii) an acceleration obtained at an inertial measurement unit (IMU); (iii) a road wheel angle; and (iv) a longitudinal velocity of the vehicle.

10. The system of claim 8, wherein the processor is further configured to determine a right wheel estimate of the rack force using forces on a front right wheel of the vehicle, determine a left wheel estimate of the rack force using forces on a front left wheel of the vehicle, and determine the first estimate of the rack force based on the right wheel estimate and the left wheel estimate.

11. The system of claim 8, wherein the processor is further configured to determine a fault in at least one of: (i) the measurement of the dynamic parameter used to calculate the first estimate; and (ii) the signal from the road wheel actuator used to calculate the second estimate.

12. The system of claim 11, wherein the processor is further configured to select the second estimate as the arbitrated rack force when no fault is found in the signal from the road wheel actuator.

13. The system of claim 8, wherein at least one of the first estimate of the rack force and the second estimate of the rack force includes a temporal sequence of forces.

14. The system of claim 8, wherein the steering wheel and the steering rack are mechanically disconnected from each other and are each coupled to a steer-by-wire system.

15. A vehicle, comprising:

a steering wheel;

a steering rack coupled to at least one of a left wheel and a right wheel;

a sensor for obtaining a measurement of a dynamic parameter of the vehicle related to a force at the steering rack;

a steer-by-wire system coupled to the steering wheel and to the steering rack, the steer-by-wire system including a processor configured to:

determine a first estimate of a rack force resulting from the force based on the measurement of the dynamic parameter;

obtain a second estimate of the rack force based on a signal from a road wheel actuator coupled to the steering rack;

select an arbitrated rack force from the first estimate of the rack force and the second estimate of the rack force; and activate a hand wheel actuator coupled to the steering wheel of the vehicle based on the arbitrated rack force to generate a feedback torque at the steering wheel.

16. The vehicle of claim 15, wherein the dynamic parameter includes at least one of: (i) an externally applied force on a tire; (ii) an acceleration obtained at an inertial measurement unit (IMU); (iii) a road wheel angle; and (iv) a longitudinal velocity of the vehicle.

17. The vehicle of claim 15, wherein the processor is further configured to determine a right wheel estimate of the rack force using forces on a front right wheel of the vehicle, determine a left wheel estimate of the rack force using forces on a front left wheel of the vehicle, and determine the first estimate of the rack force based on the right wheel estimate and the left wheel estimate.

18. The vehicle of claim 15, wherein the processor is further configured to determine a fault in at least one of: (i) the measurement of the dynamic parameter used to calculate the first estimate; and (ii) the signal from the road wheel actuator used to calculate the second estimate.

19. The vehicle of claim 18, wherein the processor is further configured to select the second estimate as the arbitrated rack force when no fault is found in the signal from the road wheel actuator.

20. The vehicle of claim 15, wherein at least one of the first estimate of the rack force and the second estimate of the rack force includes a temporal sequence of forces.

* * * * *